June 13, 1939.  C. HUMMON  2,162,617
EYE TESTING INSTRUMENT
Filed Dec. 7, 1937  4 Sheets-Sheet 1

Cyrus Hummon
INVENTOR.
BY CASnow&Co.
ATTORNEYS.

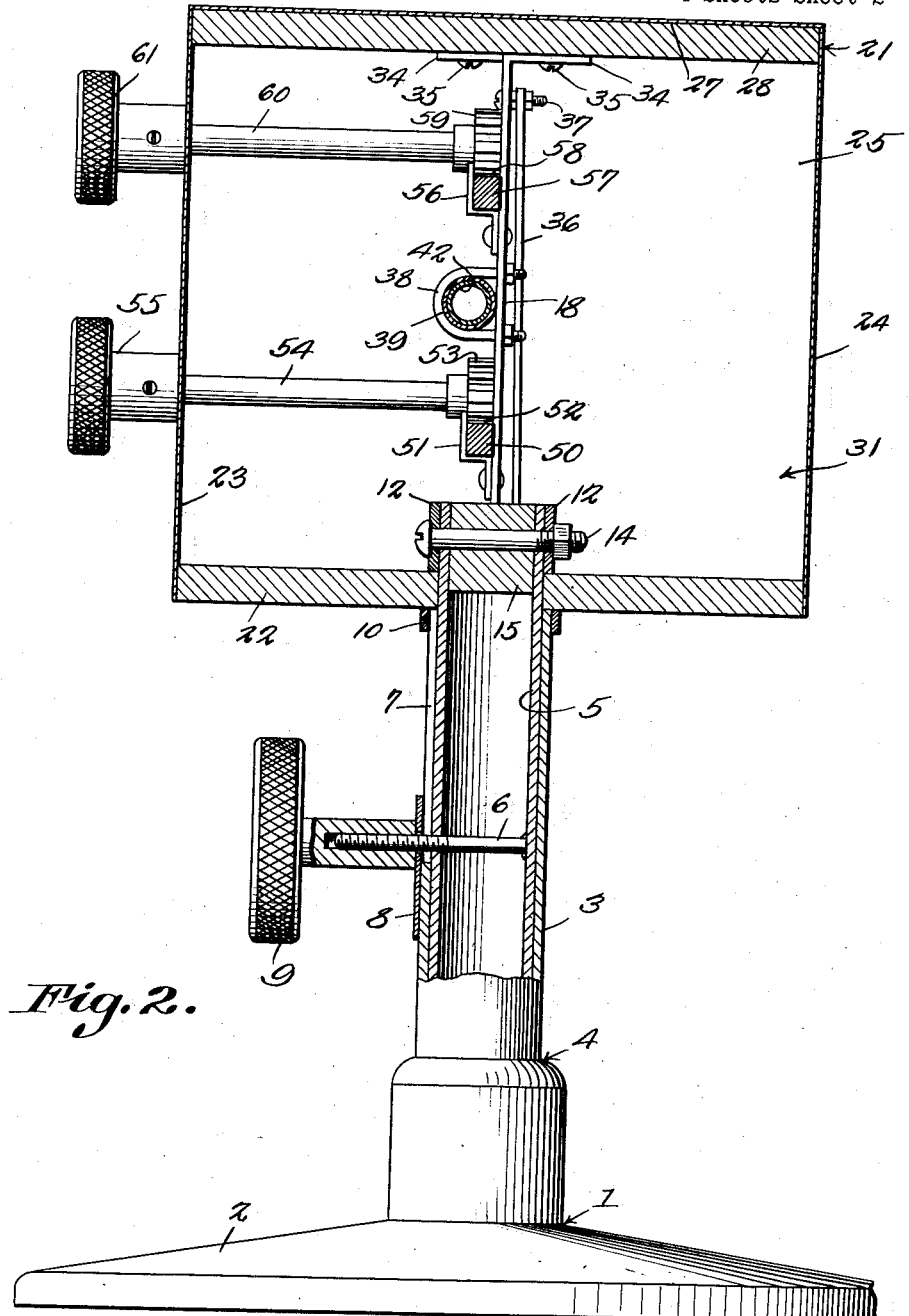

June 13, 1939. C. HUMMON 2,162,617
EYE TESTING INSTRUMENT
Filed Dec. 7, 1937 4 Sheets-Sheet 3
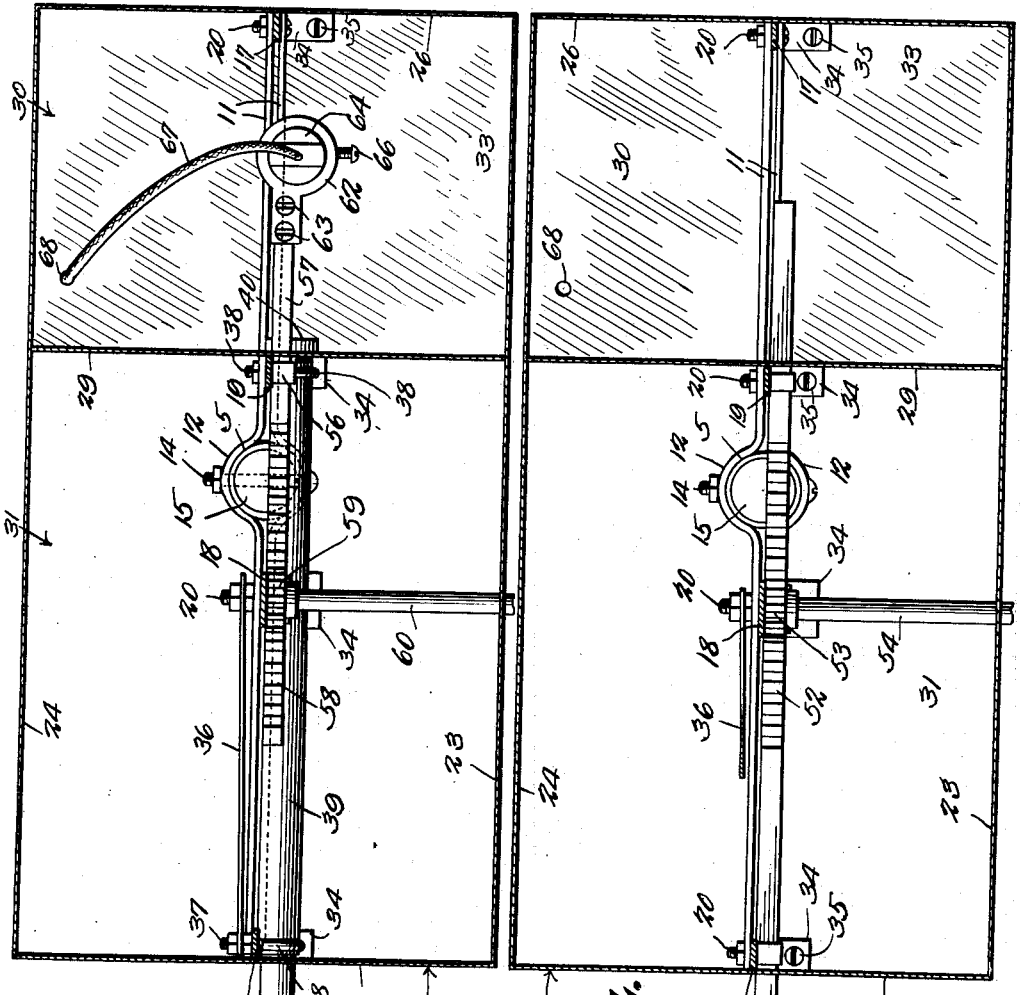
Cyrus Hummon
INVENTOR.
BY CASnow&Co.
ATTORNEYS.

June 13, 1939.  C. HUMMON  2,162,617
EYE TESTING INSTRUMENT
Filed Dec. 7, 1937  4 Sheets-Sheet 4

Cyrus Hummon INVENTOR.
BY *CA Snow & Co.*
ATTORNEYS.

Patented June 13, 1939

2,162,617

UNITED STATES PATENT OFFICE 2,162,617

EYE TESTING INSTRUMENT

Cyrus Hummon, Miami, Fla.

Application December 7, 1937, Serial No. 178,577

1 Claim. (Cl. 88—20)

This invention aims to provide a means whereby a patient, having been assured that he has a cataract, by a person skilled in the treatment of the eye, may satisfy himself in a simple way that such a condition really exists, the patient being deterred from going from doctor to doctor for confirmation, with corresponding outlay, and with the possibility that in the excursion, he may fall into the hands of the unskilled or the unscrupulous.

The invention comprises, as constituent parts, a sight tube having a fixed member having a sight aperture, a movable eye piece and means for adjusting the eye piece with respect to the aperture. The invention comprises, further, a source of light, together with means for moving the source of light with respect to the aperture.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a section on the line 2—2 of Fig. 1;

Fig. 3 is a section on the line 3—3 of Fig. 1;

Fig. 4 is a section on the line 4—4 of Fig. 1;

Figure 1:
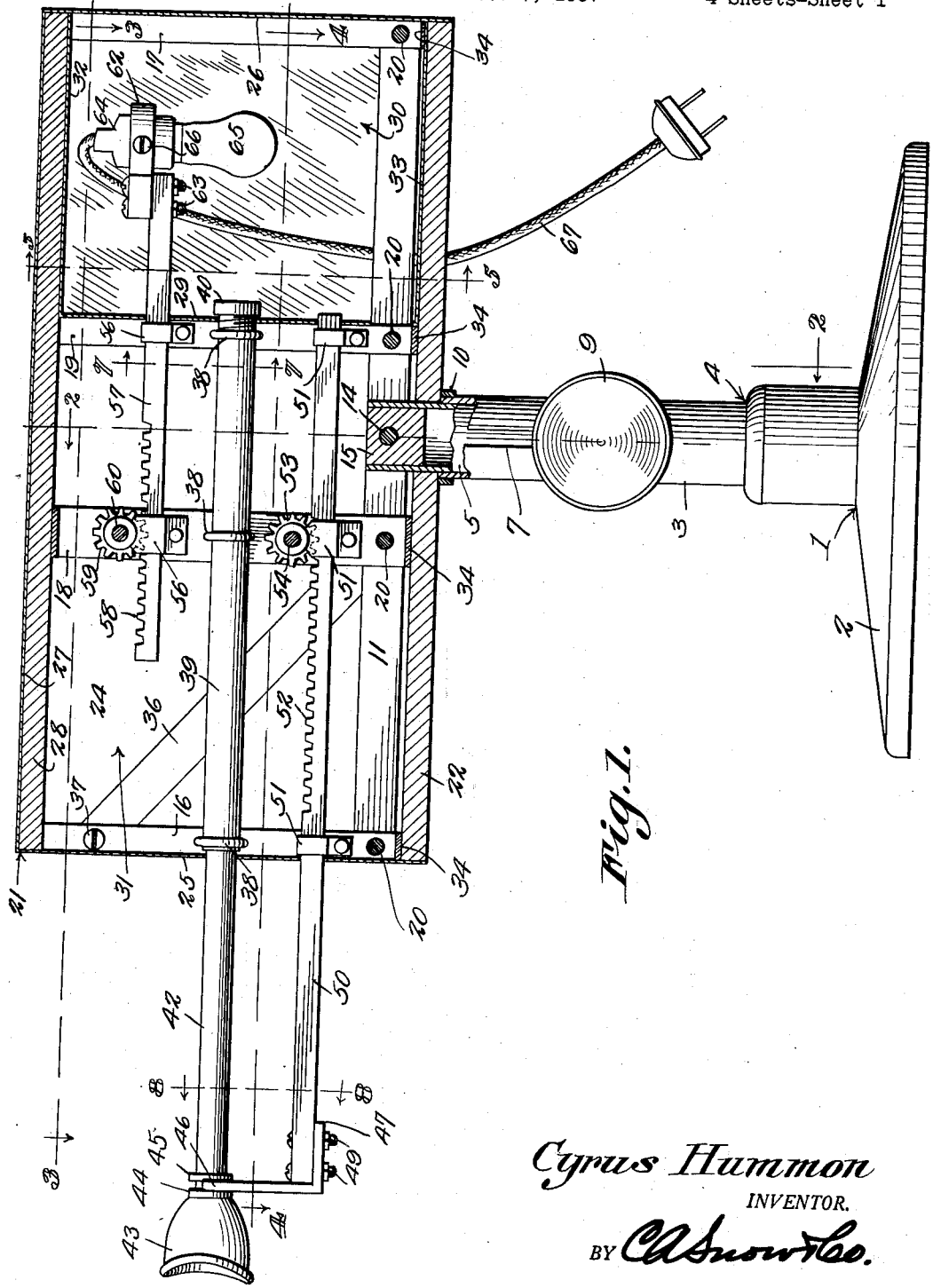
Fig. 1 shows in vertical longitudinal section, a device constructed in accordance with the invention, some parts being left in elevation.
Figure 5:
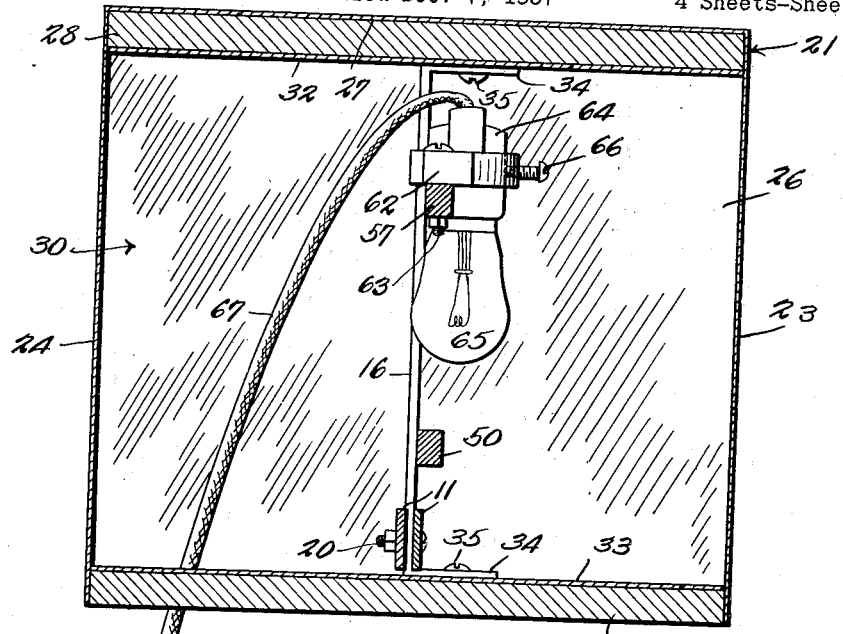
Fig. 5 is a section on the line 5—5 of Fig. 1.

Figure 1 indicates that the device comprises a support, marked by the numeral 1, and of any desired construction. Preferably, the support 1 embodies a disk-like base 2, to which is fixed the outer member 3 of a tubular vertical standard 4, comprising an inner, vertically adjustable tubular member 5.

It appears in Fig. 2, that the inner member 5 of the standard is provided with a fixed transverse stud 6, adapted to move vertically in a slot 7 (Fig. 1) formed in the outer member 3 of the standard. A trough-shaped washer plate 8 is suspended from the stud 6, nearer to the upper end of the washer plate than to the lower end of the washer plate, so that the washer plate will maintain the vertical position depicted in Fig. 2. The washer plate 8 is adapted to bear against the outer tubular member 3 of the standard 4, and is pressed there-against by the stem of a hand wheel 9 journaled on the outer end of the stud 6. Without extended description, it will be obvious that the standard 4 is adjustable as to height. Near to its upper end, the fixed outer member 3 of the standard 4 is supplied with an immovable collar 10.

Parallel bottom bars 11, shown in Figs. 3 and 4, are provided, and, intermediate their ends, the bottom bars have oppositely and outwardly curved offsets 12, which engage the upper end of the vertically movable member 5 of the standard 4, a securing element 14 being passed through the parts 12, through the upper end of the inner, vertically movable member 5 of the standard, and through a reenforcing plug 15 mounted in the member 5 of the standard—all as shown in Fig. 2.

Figure 1 makes manifest the fact that vertical terminal posts 16 and 17 and intermediate vertical posts 18 and 19 are provided, all of the posts being attached by securing elements 20 to the bottom bars 11.

A casing 21, preferably of box-like, rectangular form is provided and includes a base 22 through which the vertically movable member 5 of the standard 4 extends, as Fig. 1 will disclose. The casing 21 embodies side walls 23 and 24, a forward end wall 25, and a rear end wall 26. The casing 21 also embodies an upper top member 27, and a lower top member 28 in contact therewith, the lower top member 28, like the base 22, being made of wood, if desired. Across the casing 21 extends a deflecting partition 29, forming a light compartment 30 in one end of the casing and a compartment 31 for most of the operating mechanism, in the opposite end of the casing. The partition 29 embodies a flange 32, extended along the top of the member 28 of the casing, as shown in Fig. 1. A lower reflector 33 extends along the base or bottom 22 of the casing, between the reflecting partition 29 and the rear end wall 26 of the casing. The parts 29 and 26, and so much of the side walls 24 and 25 as lie within the compartment 30, are reflectors, to the end that the light in the compartment 30 may be as intense as possible.

As Fig. 2 will make evident, the posts 16, 18, 19 and 17 have laterally extended feet 34, secured at 35 to the base 22 and to the top member 28 of the casing 21. In order to secure stability, longitudinally of the casing 21, an inclined brace 36, shown in Fig. 1, is provided. The lower end of the brace 36 is attached to the post 18 and to the bottom bars 11 by the corresponding securing member 20. The upper or forward end of the brace 36 is attached by a securing member 37 to the forward post 16.

Figure 6:
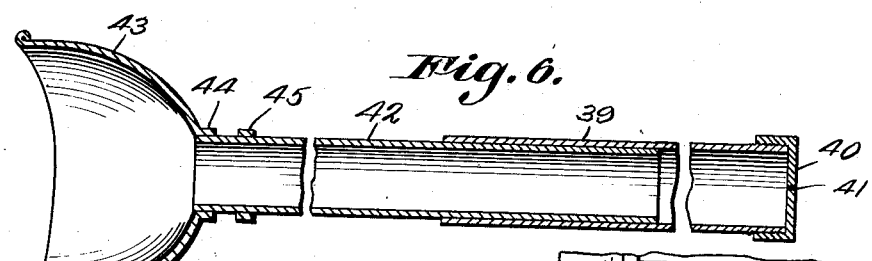
Fig. 6 is a longitudinal section of the sight tube.
Figure 7:
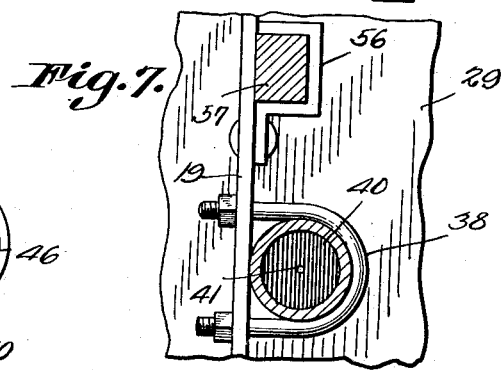
Fig. 7 is a section on the line 7—7 of Fig. 1.

By means of U-bolts 38, detailed in Fig. 7, and shown in Fig. 1, the fixed outer or first member 39 of a sight tube is attached to the posts 16, 18 and 19. The member 39 of the sight tube extends through the reflecting partition 29 and is provided, within the light compartment 30 with a cap 40 detailed in Fig. 6, the cap having a small central aperture or pin hole 41.

Figure 8:
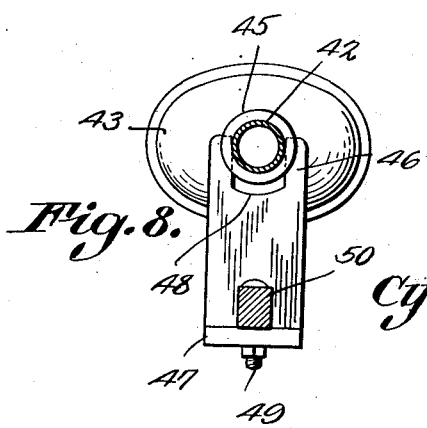
Fig. 8 is a section on the line 8—8 of Fig. 1.

In the fixed outer member 39 of the sight tube and in the end wall 25 a second tubular member 42 is mounted for longitudinal right line sliding movement and for axial rotation. At its outer end, and externally of the casing 21, the part 42 of the sight tube is supplied with a fixed eye piece 43, shaped to conform to that portion of the base which is adjacent to the eye and nose. The eye piece 43 (Fig. 6) is provided with a collar 44 disposed about the adjustable member 42 of the sight tube, a collar 45 being fixed to the part 42 of the sight tube, in close relation to the collar 44. An angle bracket 47 (Figs. 8 and 1) is provided, and at its upper end, the vertical arm of the angle bracket has a fork 46 received between the collars 45 and 44 of the longitudinally adjustable member 42 of the sight tube, the fork defining a slot 48, shown in Fig. 8, wherein the part 42 is held for rotation but against longitudinal movement with respect to the vertical arm of the angle bracket 47.

The angle bracket 47 (Fig. 1) is secured at 49 to a first rack bar or slide 50, mounted to reciprocate in the end wall 25 of the casing 21, and in guides 51 secured to the posts 16, 18 and 19. The slide 50 also has reciprocation in the reflecting partition 29 of the casing 21.

Intermediate its ends, the slide 50 is supplied with a rack 52, meshing with a pinion 53 secured to a shaft 54 (Fig. 4) mounted to rotate in the post 18 and in the side wall 23 of the casing. At its outer end, the shaft 54 is supplied with a hand wheel 55 (Fig. 2).

Having consulted Figs. 7 and 1, the reader will note that upper guides 56 are attached to the intermediate posts 18 and 19. In the guides 56, a second slide or rack bar 57, disposed above the sight tube 39—42, is mounted for right line reciprocation, the slide 57 extending into the light compartment 30, through the partition 29. At its forward end, the slide 57 is supplied with a rack 58 meshing with a pinion 59 on a shaft 60, disposed parallel to the shaft 54, the shaft 60 being journaled in the intermediate post 18 and in the side wall 23 of the casing 21. A hand wheel 61 is secured to the outer end of the shaft 60.

A comparison of Figs. 3 and 1 will show that a laterally enlarged head 62 is secured at 63 to the rack bar or slide 57, within the light compartment 30. In the head 62, the socket 64 of an electric lamp 65 is held by a pinch screw 66 or otherwise. The conductors 67 for the lamp 65 may pass downwardly through a hole 68 in the bottom 22 of the casing, depicted in Fig. 4.

Without tracing the structure through element by element, it will be understood that the lower rack bar 50 and the member 42 of the sight tube are moved longitudinally by means of the hand wheel 55 of Fig. 2. Likewise, the upper rack bar 57 may be moved longitudinally, and the lamp 65 may be shifted horizontally, with respect to the aperture 41 (Fig. 7) in the end of the fixed member 39 of the sight tube, through the instrumentality of the upper hand wheel 61 of Fig. 2.

Because the eye piece 43 as disclosed in Fig. 3, is shaped to fit about or in the eye cavity of the face, it may be desirable to rotate the sight tube through an angle of 180 degrees, depending upon whether the right eye or the left eye of the patient is to be considered. This can be done, since the part 42 of the sight tube is rotatable in the part 39 thereof, and because the part 42 of the sight tube is rotatable in the fork 46 (Fig. 8) of the angle bracket 47 on the slide 50. Nevertheless, when longitudinal reciprocation is imparted to the slide 50, the bracket 47 will cause the part 42 of the sight tube to move longitudinally, thereby adjusting the distance between the eye piece 43 and the small aperture 41 (Fig. 7) in the cap 40 of the fixed part 39 of the sight tube. This is one of the necessary considerations in the operation of the device.

When the upper rack bar 57 is shifted longitudinally, the lamp 65 is shifted accordingly, with respect to the aperture 41 in the fixed part 39 of the sight tube. Because the parts 29, 32, 26 and 33 are reflectors, there will be a high degree of illumination within the light chamber 30.

After a proper adjustment has been effected, as hereinbefore explained, when the patient looks through the sight tube 42—39, he will see a highly illuminated area, in which there are one or more dark areas, representing the cataract condition with which he is afflicted. The patient, therefore, does not have to depend upon the verbal assurance of another that cataracts exist. The cataract condition may be made so plainly visible to the patient that he cannot reasonably doubt its existence.

For the proper operation of my improved cataroscope, the patient is seated with the sight tube, we will say in front of the right eye and the left eye will be covered. Then the light in the light compartment will be turned on and will be adjusted with reference to the distance from the one-half millimeter aperture. The more dense the cataract, the closer to the aperture the light will be adjusted, in order to produce more illumination. Next position the patient at the proper distance from the aperture or one-half millimeter opening where the light is brightest to the patient. The rays of light emanating from the light bulb will pass through the one-half millimeter aperture and through the pupil of the eye back to the retina of the eye where there are thousands of nerves to receive the impression from the light. There are no reflectors back of the light for a doctor to look into, and if a patient does not have a cataract he will observe a full round field of illuminated area. However if the patient does have a cataract, there will be a clouded or dark area visible to him where the light rays will not pass through the area of the cataract. Thus a patient may definitely determine whether he has a cataract, and the degree or size thereof. The light bulb and sight aperture and eye piece will all be arranged in a straight line with no lenses in between, as are used in other types of eye testing apparatus.

From all of the foregoing it will be obvious that the device forming the subject matter of this application is so constructed that the objects set forth in the opening portion of the specification will be consummated.

What is claimed is:

In a patient-operated service for manifesting cataract to the patient, a casing comprising a light-chamber, first and second rack bars, means for supporting the rack bars for longitudinal movement in the casing, shafts extended into the casing and disposed transversely of the rack bars, means carried by the casing for supporting the shafts for rotation, means for rotating each shaft independently of the other at the will of an operator, pinions on the shafts and meshing with the respective rack bars, a lamp carried by the second rack bar and located in the light-chamber, a sight-tube comprising a first tubular member, and a second tubular member extended out of the casing and slidable longitudinally on the first tubular member, the first tubular member having a pin-hole aperture communicating with the light-chamber, the second tubular member having an eye-piece located without the casing, the lamp, the pin-hole aperture and the eye-piece being in a straight line, means for holding the first tubular member fixed in the casing, and means for connecting the second tubular member to the first rack bar, thereby to effect a distance adjustment between the eye-piece and the pin-hole aperture, when the first rack bar is moved longitudinally by the corresponding shaft and pinion.

CYRUS HUMMON.